United States Patent [19]
Del Faro et al.

[11] 3,887,052
[45] June 3, 1975

[54] MACHINE TOOL MONITORING UNIT

[76] Inventors: Gordon P. Del Faro, 23529 Dolorosa, Woodland Hills, Calif. 91364; Eugene E. Valentine, 11557 Dellmont Dr., Tujunga, Calif. 91042

[22] Filed: Nov. 7, 1973

[21] Appl. No.: 413,586

[52] U.S. Cl. .............. 192/127; 192/131 R; 271/259; 328/75
[51] Int. Cl. ..................... F16p 3/20; B65h 63/06
[58] Field of Search ............ 192/125 A, 127, 131 R; 328/75, 130; 271/259, 261; 100/53

[56] References Cited
UNITED STATES PATENTS

| | | | |
|---|---|---|---|
| 3,453,500 | 7/1969 | Lundin et al. | 192/127 X |
| 3,626,956 | 12/1971 | Sauder | 271/259 X |
| 3,682,131 | 8/1972 | Algeri et al. | 328/75 X |
| 3,813,021 | 5/1974 | Kramer | 192/131 R X |

Primary Examiner—Allan D. Herrmann
Attorney, Agent, or Firm—Fulwider, Patton, Rieber, Lee & Utecht

[57] ABSTRACT

Apparatus for monitoring and controlling the operation of a machine tool including a main switching circuit adapted to be rendered conductive on receiving a predetermined concurrent combination of switch signals, thereby assuring that both hands of an operator are involved in the machine start-up sequence, such main switching circuit further completing the switching logic of a plurality of monitoring circuits respectively monitoring the status of the object operated on by the machine tool and the status of the tool to provide a predetermined response during machine operations corresponding to the combination of the monitoring signals. Selected ones of the monitoring circuits are references to a cyclic element of the machine tool, providing a memory function read out at a predetermined interval in each cycle in combination with instantaneous read out of the status of the object.

14 Claims, 6 Drawing Figures

3,887,052

MACHINE TOOL MONITORING UNIT

BACKGROUND OF THE INVENTION

1. Field of the Invention

The present invention relates to protective circuits, and more particularly to circuits providing automatic machine shut down in selective response to a plurality of signals.

2. Description of the Prior Art

In machine tool operations and particularly in die operations where tools of large mass are driven in order to perform certain operations on sheet stock and the like, the requirement for sensors which indicate the status of the stock as well as the die is of vital importance. In particular where automatic or repetitive stamping operations are involved the speed at which any one cycle of operation is executed is such that any manual or human intervention is typically too slow as well as unsafe for effective monitoring of the system. It is particularly slow when considered with the plurality of possible indecies that must be necessarily observed in order to provide a correct reading of the status of the operations. Such monitoring is further complicated by any safety precautions that are typical in large machine installations where the limited speed of a human operator is such that any corrective measures when exercised by him would necessarily be too slow and therefore present a hazard to his own person. Thus there have been many devices developed in the past which are specifically addressed to this problem, i.e. devices like impact sensors or position sensors which indicate either the progression or the location of the stock through a particular automatic advance system. Such devices, although typically sufficient for one particular operation, are insufficient for a plurality of sensing modes that can be carried out. More specifically the prior art devices of this kind are typically decoupled from the operation of the die driving mechanisms and therefore measure indirectly the progression of the die according to indicia on the stock which should be synchronized with the die. Thus the prior art devices failed to combine the motion of the die with the particular responses generated in any logical combination. Since there are many possible ways through which a particular index can be registered, such as for example a normally open circuit compared with a normally closed circuit, as well as amplitude responsive circuits, the requirement of the aforementioned logical combination must be fully adaptive to the various modes through which a particular registry is made. These particular features were all lacking in the prior art devices.

SUMMARY OF THE INVENTION

Accordingly, it is the general purpose and object of the present invention to provide a machine tool monitoring unit which is adaptive to receive a plurality of register signals in selected switch form including means to store selected ones of such signals in a logical switching configuration to be coupled with a signal indicating the status of the machine tool to produce a delayed shut down, while selected other ones of such register signals produce an immediate shut down. Further objects of the invention are to provide a monitoring unit which requires a predetermined plurality of signals logically mixed in order to effect either a start-up or a shut down of the monitored machine tool. Yet another object of the invention is to provide discrimination circuits which are selectively responsive to switch closure, switch openings, and signal amplitude changes, and which include memory devices by which the status of the signals is recorded to combine such signals with a machine tool status signal. Yet another object of the invention is to provide signal switches including circuit means for logical combining thereof.

Briefly, these and other objects are accomplished within the present invention by providing a machine tool monitoring unit having a plurality of receiving circuits, one of such being a circuit responsive to the linear amplitude of a particular signal, the second such circuit being responsive to a switch closure disposed to be actuated by the worked article, a third circuit being responsive to a switch opening while a fourth circuit being responsive to, alternatively, a switch closure or a switch opening and including an associated memory device therewith. The combination of the outputs of the aforementioned circuits is collected, together with a signal indicative of the status of the machine tool within any one cycle of operation at the input of a conventional OR gate which then provides an output signal to drive a main switching circuit. The present inventon further logically combines the status of the tool advance mechanism of the machine tool with the shut down signal, there being a predetermined sequencing included in the main switching circuit controlling both the start-up and the shut down. As a further feature of the invention includes an immediate stop circuit whereby a particular condition will effectuate an immediate halt to the operations witbout permitting further advance of the apparatus of the machine tool.

DESCRIPTION OF THE SPECIFIC EMBODIMENT

Generally, the invention is directed at providing an integral monitoring circuit which responds through a common set of elements to a plurality of various sensing inputs indicating the operating status of a machine tool. Although not limited to die presses, the teachings of the present invention are most effective when combined therewith and the embodiments contained herein specifically refer to such combination.

Figure 1:
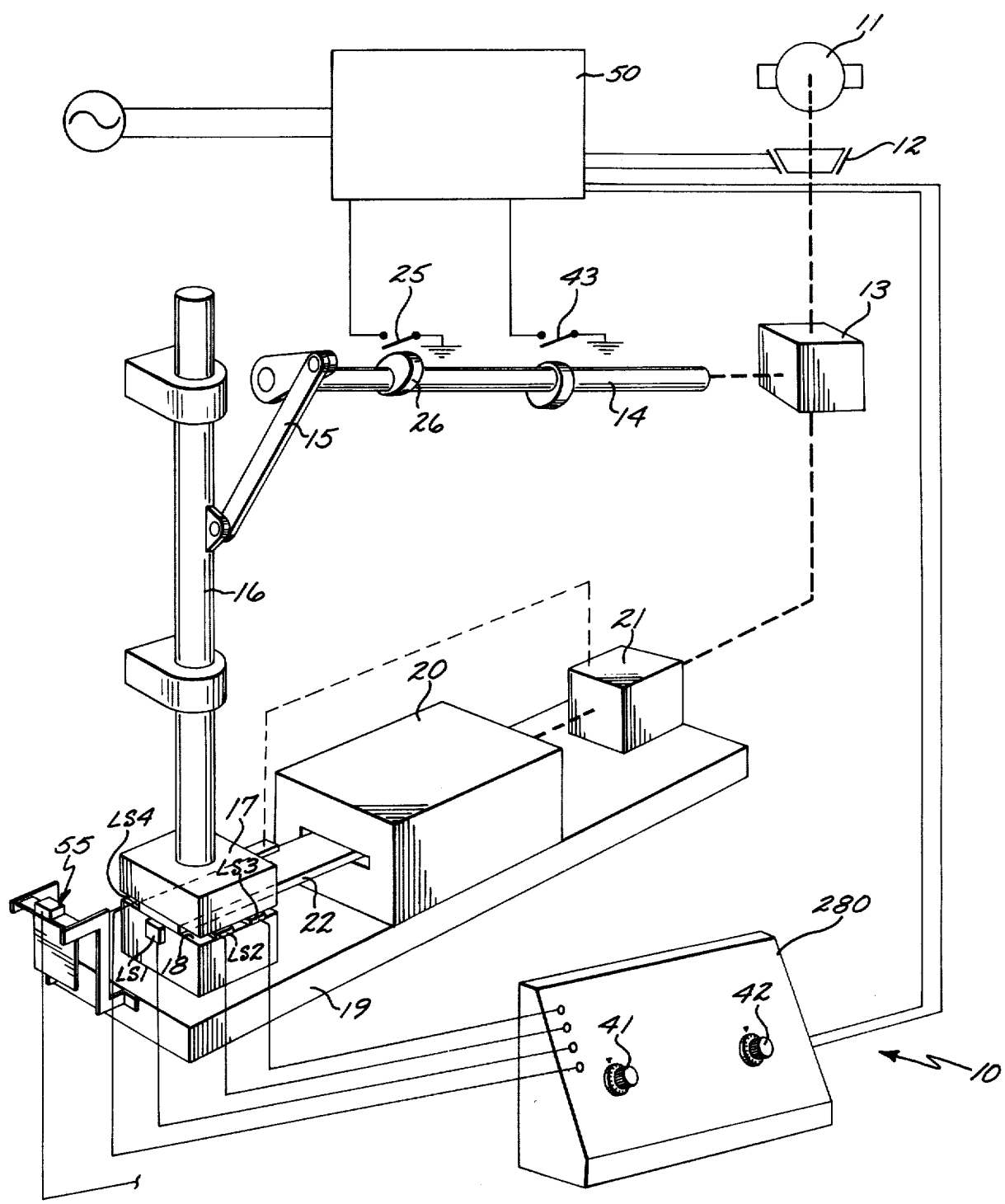
FIG. 1 is a perspective view of an automatic die press including a monitoring circuit construction according to the present invention.

As shown in FIG. 1, a die press generally designated 10 includes an electric motor 11 selectively engaging through an electropneumatic clutch 12, a gear train 13 which at the output thereof drives a crankshaft 14 articulating across a connecting rod 15 a die assembly 16. The die assembly 16 is disposed for vertical articulation to cyclically extend a male die 17 mounted on the lower end thereof into a female die 18 disposed in opposing relationship on a mounting plate 19. An automatic feed device 20, geared to cooperate with the strike of the die press 10 by a gearing device 21, provides for automatic dispensing of sheet stock 22 on each separation or upward strike of the die press 10, cyclically actuated in common with a die release switch 43. Automatic die presses of this configuration are conventional in the art, as for example, a die press manufactured by Bench Manufacturing Company, of 1835 West Rosecrans, Gardena, Calif., under the model designation Die Master, OBI, 25-Ton.

Typically, such presses operate at large force levels and at high strike rates and therefore, most always expose any operator to a risk of injury if the operator attempts to manually intervene or correct the operation of the press. Particularly in the instance of a jam-up or misalignment of the punched articles formed in the die press, it is required that the die press be stopped on the upward end of its strike to permit manual correction. Furthermore, following any such correction, it is imperative that the start-up sequence be such as to assure that both hands of the operator are withdrawn from within the press to allow the press to proceed with a punch stroke. Such start-up sequence is assured by providing two manual switches, i.e. a reset switch 41 and a start switch 42, which must be depressed within a preset time interval in order to permit a downward stroke restarting the automatic punch sequence.

For this purpose, a monitoring circuit 50 is combined with the press 10, circuit 50 sensing through a plurality of limit switches shown as switches LS1-LS4, the alignment of the sheet stock within the die. In the alternative, sensing devices, described in detail below, may be substituted for selected limit switches to register ejection of the struck article following each die stroke to thereby assure proper clearing of the die press. Generally, the monitoring circuit 50 is gated to synchronize with the die stroke such that the main control mode thereof is concurrent with the upper stroke limit of the press 10. Accordingly, it is necessary to include in the monitoring circuit 50 short term memory devices, reset within each stroke cycle of the die assembly, whereby any fault registry sensed at any time prior to the upper stroke limit of the die assembly is maintained to effect a machine shut down at a point of maximum die separation. In this manner a maximum die separation is assured at the time when manual corrections are made within the die.

Figure 2:
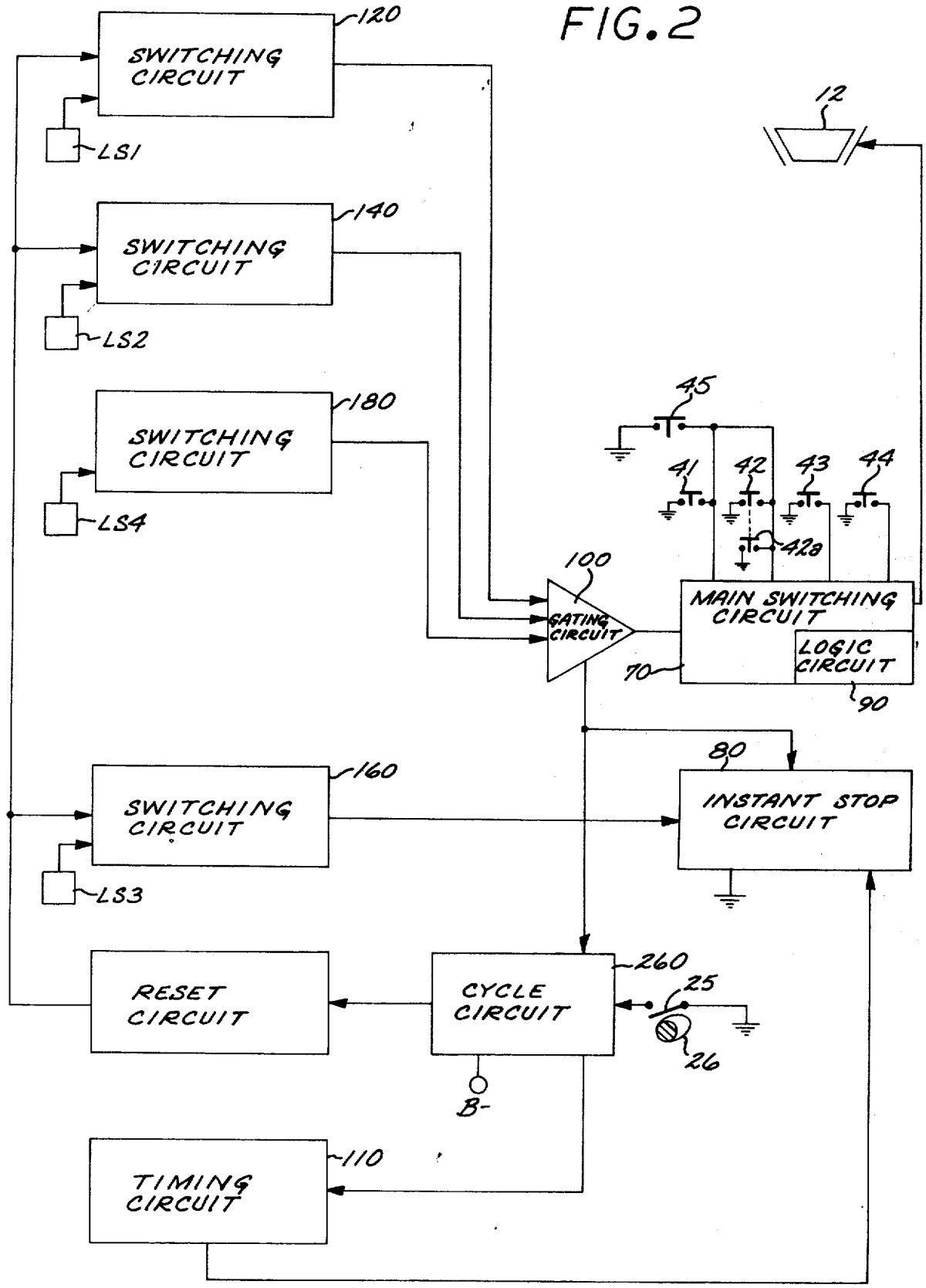
FIG. 2 is a block diagram of the machine tool monitoring circuit constructed according to the present invention.

More specifically, the inventive monitoring circuit 50, shown in block diagram form in FIG. 2, comprises a plurality of input switching circuits 120, 140, 160 and 180. Switching circuits 120, 140, 160 and 180 each receive at the input thereof a switching signal developed by the corresponding limit switches LS1-LS4. The output signals of the switching circuits 120, 140 and 180 are collected at the input of a gating circuit 100 which is further rendered operative by a cycle circuit 260. As will be shown hereinbelow, the output signals of circuits 120, 140 and 180 are collected in a logical OR at the input of the gating circuit 100 while the cycle circuit 260 provides an output signal which is combined in the gating circuit 100 according to a logical AND. Although many circuit configurations are available to accomplish this logical signal combination, the circuit selected as most effective in this embodiment comprises a conventional operational amplifier connected in open loop collecting at the inverting terminal the respective inputs from circuits 120, 140 and 180, where the operational amplifier is grounded across the cycle circuit 260 concurrent with each switching transient of a cycle responsive switch 25.

To provide for a machine stop which is independent of the stroke cycle, the monitor circuit 50 further includes an instant stop circuit 80 connected to interrupt power to the clutch 12 in response to the closure of switch LS3 registered by the circuit 160 or by the closure of a manual switch, such circuit having a separate switching input to be shown in detail hereinbelow, disposed to register any die condition requring immediate interruption of the cycle.

Thus, there are two distinct modes of machine control provided by the monitoring circuit 50 where one mode is independent of the die stroke while another mode is effectively gated by the cycle circuit 260 to a particular cycle event. The cycle event accomplishing such gating is provided by a cycle switch 25 disposed to be closed by a cam 26 mounted on the crankshaft 14 of the press 10, the angular alignment of the cam lobe of cam 26 being set by conventional alignment means to accommodate any stopping transient or time constant associated with all such machine tools and particularly tools driving large inertia die assemblies. A timing circuit 110 is connected in parallel with one end of switch 25 to provide a redundant check on the operation of switch 25, according to means further described hereinbelow.

As shown further in FIG. 2, the machine tool monitoring circuit 50 includes a main switching circuit 70 connected to receive the switching signals developed by the start switch 42, the reset switch 41, a die hold release switch 43 and an instant stop switch 44, such switching signals being logically combined in a logic circuit 90. The switching circuit 70 combines such signals within the logic circuit 90 together with the signal output from the gating circuit 100 according to means further described to effect a machine start-up, a sequenced shut down or an emergency stop. In particular, a machine start-up can be effected by a concurrent depression of the reset switch 41 and the start switch 42, thus assuring that both hands of the operator are involved in the start-up sequence and therefore not exposed to injury. Such concurrent depression of the two switches, however, is only necessary when the cycle stroke is in its downward quadrant. In instances where the instant stop circuit 80 halts the die press 10 at a point in the cycle stroke providing insufficient clearances to extract the faulty article at an upward cycle quadrant only, a concurrent depression of start switch 42 and switch 41 is necessary to effect further downward progression of the die assembly 16 through the die stroke. This particular feature is incorporated in the logic circuit 90 and is facilitated by the closure of the die hold release switch 43 which operates concurrent with the release of the article from the die at the beginning of the upward stroke of the die assembly 16.

In the alternative, the operation of die press 10 can be maintained by a foot switch 45, which is in parallel with switches 41, 42 and 42(a). The automatic operation is maintained as long as the signal output of the logic circuit 90 conforms to provide a predetermined output signal, described in more detail hereinbelow, such output signal indicating a preselected switching combination of a plurality of switching signals developed by limit switches LS1, LS2, LS3 and LS4. As a further alternative, the monitoring circuit 50 can be adapted to accept the signal from a strike plate 55 disposed in substitution for the switch LS1 to intercept and register the impact of the article as it is ejected from the die.

Figure 4:
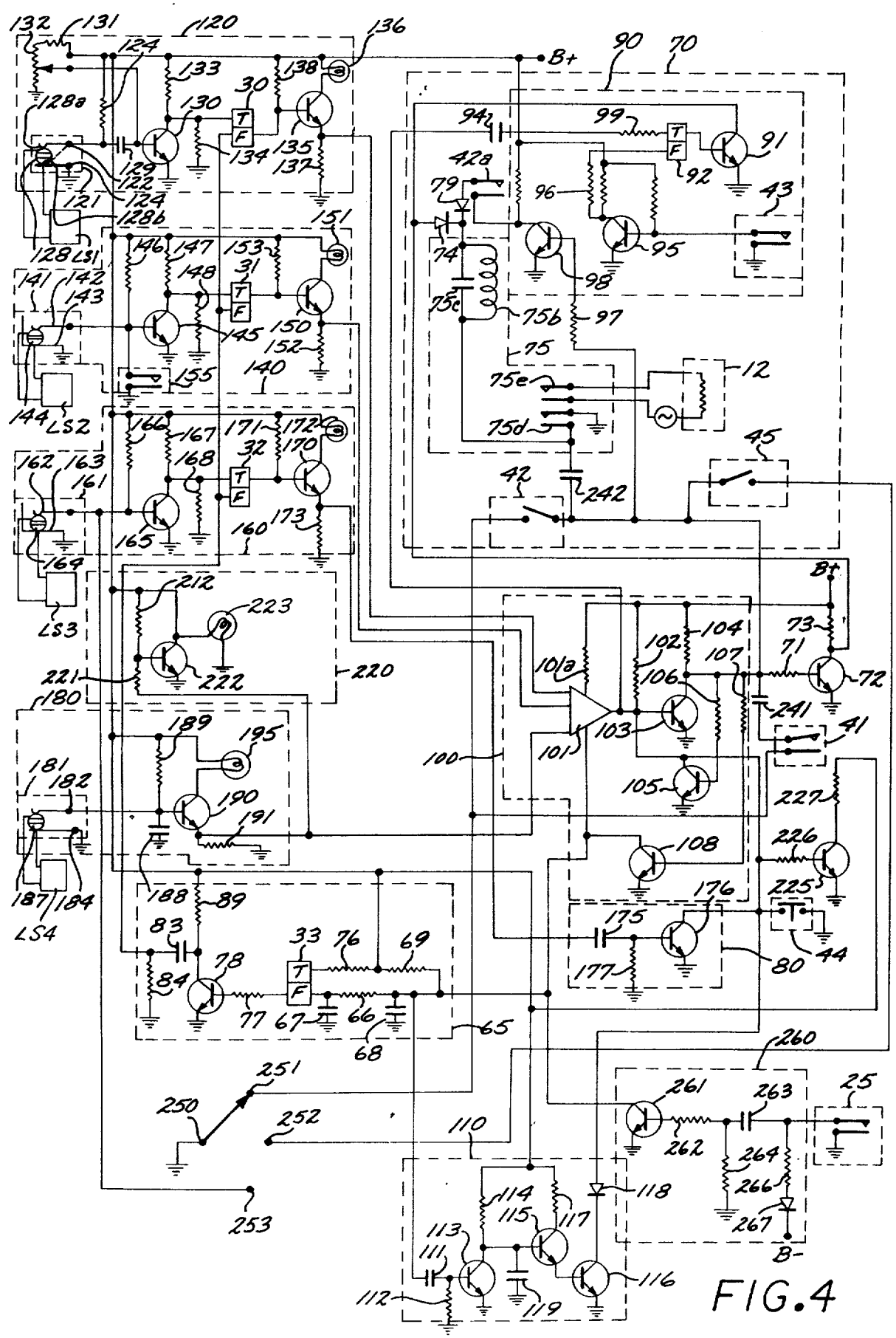
FIG. 4 is a circuit schematic of the circuit shown in FIG. 1.

As shown in FIG. 4, limit switches LS1, LS2, LS3 and LS4 are respectively connected to switching circuits 120, 140, 160 and 180, where the output of switching circuits 120, 140 and 180 are collected at the input of the gating circuit 100. Gating circuit 100 is shown by way of example as an operational amplifier 101 driven in open loop as a high gain device and being tied in parallel to the above switcing circuits at the inverting terminal thereof. The operational amplifier 101, furthermore, is connected between a reference voltage B+ and one terminal of the cycle circuit 260 forming a ground return to provide circuit continuity each time the switch 25 goes through a closing transient. Thus amplifier 101 is rendered operative only during those portions of the cycle at which switch 25 closes, being driven into saturation by any one or more high inputs from the switching circuits to act as a non-exclusive OR gate. The inverting input connection produces at such times a low output signal concurrent with the closure of switch 25, according to the Boolean OR × NOT, where the output signal is low if any one of the signals from switching circuits 120, 140 and 180 is high.

Switching circuit 120 includes an input receptacle 121 comprising a contactor 122 disposed to articulate between a grounded terminal 124 and an open state. Terminal 124 is connected to ground forming a grounding circuit with contactor 122 which is conventionally spring biased to such position (shown in dotted line) and which is lifted off from such position by the insertion of a jack 128 therebetween. Jack 128 is conformed in the manner of any conventional input jack to provide two contacting surfaces 128(a) and 128(b) respectively engaging contactor 122 and terminal 124, across which the limit switch LS1 is disposed. The pivot end of contactor 122 is connected across a coupling capacitor 129 to the base terminal of a common emitter configured transistor 130. The pivot of contactor 122 is further connected to the voltage B+ across a base resistor 124 while the base terminal of transistor 130 is also connected to the wiper of an adjustable resistor 132 connected in series with a limiting resistor between the reference voltage B+ and ground. The collector terminal of transistor 130 is connected across a collector resistor 133 again to the voltage B+, and across a resistor 134 to ground. The collector signal of transistor 130 is fed to the true input terminal of a flip-flop circuit 30 which at the false output terminal connects to the base of a transistor 135. Transistor 135 is connected in an emitter follower circuit across a lamp 136 to the voltage B+ and across an emitter resistor 137 to ground, the base terminal being conventionally biased by a base biasing resistor 138 also connected to the voltage B+. The voltage developed across the emitter resistor 137, i.e. the emitter terminal of transistor 135, is connected to one input terminal of the gating circuit 100.

Similarly, the switching circuit 140 includes a receptacle 141 having a contactor 142 disposed in an opposing relationship with a grounded terminal 143 for receiving therebetween a jack 144 completing a circuit across limit switch LS2. Limit switch LS2 is a normally open switch attached to the mounting plate 19 in any convenient manner at a position where a faulty misalignment of the sheet stock 22 would cause a switch closure. In order to register the location of the sheet stock, a plurality of limit switches like switch LS2 can be connected in parallel where the closure of any one thereof will short the circuit between contactor 142 and terminal 143. The pivot of contactor 142 is again connected to the base of a common emitter configured transistor 145, base biased by a biasing resistor 146 connected between the voltage B+ and the base, transistor 145 being similarly connected to the voltage B+ as transistor 130 by a collector resistor 147 and a resistor 148 to ground. The collector terminal of transistor 145 is connected to the true input terminal of a flip-flop 31 where the true output terminal thereof is connected to the base of an emitter follower configured transistor 150 again connected between a lamp 151 and an emitter resistor 152. The emitter terminal of transistor 150 is also connected to the input of gate 100. In order to facilitate a manual switching signal which would effect a machine stop at the top of the stroke cycle, a cycle stop switch 155 is connected in parallel with receptacle 141, allowing manual shutdown of the press through the switching circuit 140.

The switching circuit 160 is configured in a substantially identical manner with switching circuit 140. An input receptacle 161 is disposed to receive an input jack 164 between a contactor 162 and a grounded terminal 163. Jack 164 completes the circuit across the limit switch LS3 which again is a normally open switch, or a plurality of normally open switches in parallel, adapted to respond to critical projections of the stock 22. Contactor 162 controls the conduction of a transistor 165 by shorting out the base voltage developed across a base biasing resistor 166 where the collector terminals of a transistor 165 is connected to the voltage B+ across a collector resistor 167 and to ground across a resistor 168. The collector terminal of transistor 165 drives the true input terminal of a flip-flop 32, which, again, at the true output terminal is connected to drive an emitter follower circuit including a transistor 170 connected at the base to a base biasing resistor 171 and between a lamp 172 and emitter resistor 173 at the other two ports thereof. The emitter terminal of transistor 170, however, is connected in shunt across gate 100, across a coupling capacitor 175 to the base of a transistor 176, forming an instant stop circuit 80, which is connected in a common emitter circuit to the output terminal of the amplifier 101. Thus the signal from switching circuit 160 is in parallel across the input to the gating circuit 100 and is therefore not dependent on the status of the cycle switch 25. The connection between capacitor 175 and the base of transistor 176 is bled to ground across a bleed resistor 177.

Switching circuit 180, similar to circuit 120, receives the output of limit switch LS4 across a jack 187 inserted in a ganged switch receptacle 181. In a similar manner, receptacle 181 includes a contactor 182, contactor 182 being spring biased against a grounded terminal 184, unless separated therefrom by the insertion of jack 187. The pivot of contactor 182 is connected to the base of a transistor 190, the base terminal thereof being further biased by a biasing resistor 189 connected to the voltage B+ and filtered to ground across a capacitor 188. Transistor 190 is connected in the manner of an emitter follower device developing an output signal across an emitter resistor 191 connected between the emitter terminal and ground. The signal across resistor 191 of transistor 190 is in turn connected to the input of the gating circuit 100. The collector of transistor 190, furthermore, connects across a lamp 195 to the voltage B+.

As indicated above, the gating circuit 100 is powered by the voltage B+, being connected to the amplifier 101 by a current limiting resistor 101(a), and is grounded by the ground return lead completed across the cycling circuit 260. Gating circuit 100 is therefore operative only at such times when switch 25 goes through a closing transient. The output of amplifier 101 is connected to the base of a transistor 103 biased by a base biasing resistor 102 in circuit from the voltage B+. Transistor 103 is again configured as a common emitter transistor being connected at the collector to the voltage b+ across a collector resistor 104 and to the base of a transistor 105 across a resistor 106. Transistor 105 forms a parallel collector-to-emitter circuit to ground across the output of amplifier 101 and therefore from the base of transistor 103, thus forming a bistable tail-to-mouth configuration with transistor 103 in the manner of a conventional flip-flop. Accordingly, as the output of the amplifier 101 goes high, transistor 103 is rendered conductive dropping the collector voltage thereof and thus rendering transistor 105 non-conductive, both transistors maintaining such state in the manner of a flip-flop circuit. The collector of transistor 103 is furthermore connected across a resistor 107 to the base of a transistor 108, the latter being connected by the collector to the cycling circuit 260 to form a parallel ground return path which is latched in when the output of gating circuit 100 is low in response to a fault registry, effectively by-passing the operation of the cycle switch.

More specifically, the timing circuit 110 is connected to the cycle switch 25 across a coupling capacitor 111 which connects, both to a bleed resistor 112 to ground, and to the base of an input transistor 113. Transistor 113, again configured in common emitter mode, is connected across a collector resistor 114 to the voltage B+, the collector signal thereof being further connected by its emitter terminal to the base of a transistor 116. The collector of transistor 115 is again tied to the voltage B+ across a collector resistor 117 while the collector of transistor 116 connects across a diode 118 to the collector of transistor 105. The collector-to-base connection between transistors 113 and 115 is further connected to ground across a capacitor 119, where capacitor 119 sets a time constant for the timing circuit, charging up to a conducting voltage in transistor 115 unless transistor 113 is rendered conductive and shorts out the charge before such level is reached.

The collector signal of transistor 105 is further connected to the collector of the output transistor 176 in the instant stop circuit 80 which forms a further parallel circuit across transistor 105. Once the collector of transistor 105 is pulled down by transistor 176, the latch formed by transistors 103 and 105 is set and a machine shut down signal is produced independent of the cycle.

The machine stop signal, i.e. the output signal of amplifier 101, is connected to one input of the main switching circuit 70. The collector signal of transistor 103 is connected across a resistor 71 to the base of a common emitter transistor 72 which, in turn, is connected across a collector resistor 73 to the voltage B+. The collector signal of transistor 72 connects to the anode of a diode 74 which, at the cathode, connects to one terminal of an end of a coil 75(b) included in a latching relay 75. The cathode of diode 74 is further tied to the cathode of a diode 79 which at the anode connects to the floating terminal of a switch 42(a) disposed for concurrent or ganged closure with switch 42. Coil 75(b) is shunted by a capacitor 75(c) and the other end of coil 75(b) is grounded across a latching switch 75(d), held closed by the coil in the conventional manner of a self-latching relay, and across a capacitor 242 to the ungrounded terminal of the start switch 42 connected in parallel thereacross. Since the collector signal of transistor 103 is latched by transistor 105 when the gating circuit 100 registers a low, and since the gate is latched in that state by transistor 108, the reset switch 41 provides a means for unlatching this switching combination. More specifically, one terminal of the reset switch 41 is connected across a capacitor 241 to the base resistor 71 of transistor 72, being spring biased to a normally open state, such that upon a manual closure transient of the reset switch the collector voltage of transistor 103 is temporarily pulled to ground across capacitor 241, rendering transistor 108 non-conductive to unlatch the gate 100 and at the same time rendering transistor 72 non-conductive. When the collector voltage of transistor 72 is thus raised, the anode voltage of diode 74 raises to energize one end of coil 75(b). The other end of coil 75(b) is then grounded across capacitor 242 by the concurrent manual closure transient of the start switch 42, and the relay 75 is latched by the self-latching switch 75(d), pulling in output terminals 75(e) which complete the circuit across the clutch 12. In this manner, a concurrent manual closure of two switches is required in order to effect a restart of the die press 10.

The anode of diode 74 is also tied to the collector terminal of a transistor 91. The output signal of amplifier 101 is tied across a coupling capacitor 94 in series with an input resistor 99 to the true input of a flip-flop 92 in the logic circuit 90. Transistor 91 is in turn gated to conduct by the true output of flip-flop circuit 92, where the flip-flop circuit 92 is connected across a resistor 96 at the false input to the collector of a common emitter configured transistor 95. Transistor 95 is connected at the collector to the voltage B+ and at the base both to the voltage B+ and to the floating terminal of the die release switch 43, which at the fixed terminal is tied to ground. The other side of switch 42(a) is connected to the collector of a transistor 98 which at the base is connected across a resistor 97 to the collector of transistor 103 and at the collector to the voltage B+. Thus transistor 98 acts to provide a second source of power across coil 75(b) whenever the signal from amplifier 101 is high, i.e. between the closure transients of switch 25. During the closure of the start switch 42 switch 42(a) is ganged for concurrent closure to provide a secondary input path to coil 75(b) should the voltage out of amplifier 101 be low during start up or when transistor 91 is conducting. This secondary path is powered only when transistor 98 is not conducting, i.e. only when transistor 103 is conducting. Transistor 91 follows the flip-flop 92 and will therefore be non-conducting after the closure of switch 43, the periodic closure of switch 43 providing a reset signal to the false input of flip-flop 92. Transistor 91 therefore locks out transistor 72 on the downstroke.

Thus, while on the downstroke or before switch 43 is closed, the depression of the start switch 42 and switch 41 will energize the clutch 12. On the upstroke, or after switch 43 goes through a closing cycle, a high input is set into the false terminal of flip-flop 92 by transistor 95 being rendered non-conductive, which renders transistor 91 non-conductive. Accordingly, the die assembly 16 can be lowered only for as long as both the start switch is depressed followed, within the time constant set by circuit 110, by the closure of the reset switch to automatically separate to the top of the stroke after the die release switch 43 has gone through its closure cycle. In this manner, corrective measures can be manually made while the die is separating, while both hands are required to close the die.

It is to be understood that the operation of the timing circuit 110 effectively verifies the operation of cycling circuit 260 and times the sequence of switch depressions.

The cycle switch 25 further provides a reset signal to flip-flops 30, 31 and 32 as produced by the reset circuit 65. More exactly, the circuit 260 is connected to the false input of a flip-flop 33 across a resistor 66, the resistor being further connected to ground at both ends by capacitors 67 and 68 to form a low pass filter. The cycling circuit connection is further connected to the voltage B+ across a resistor 69, the voltage B+ being connected to the true input of flip-flop 33 across a resistor 76. Thus in steady state both the true and the false input to the flip-flop are high. When the cycle switch closes, however, the false input goes low after a time delay according to the filter time constant, and after the time constant is reached, the false input decays to low pulling the flip-flop 33 along with it. At this time the false input is low while the true input remains high switching the flip-flop to a true output state. The false output of the flip-flop 33 is connected across a resistor 77 to drive the base of a common emitter transistor 78 connected at the collector to the voltage B+ across a collector resistor 89. The collector of transistor 78 is further coupled across a coupling capacitor 83 to the false inputs of flip-flops 30, 31 and 32, resetting such flip-flops, and across a bleed resistor 84 to ground to bleed off any residual voltages. This reset signal is set to occur at a time increment after the AND gating of the amplifier 101, and is therefore not effective once the gating circuit 100 latches to a failure mode. Furthermore, the output from circuit 120 is dependent on the state of the true output terminal of flip-flop 30. Thus, only if a switching signal gates this flip-flop 30 after the reset spike is passed will a fault indication be made. Thus the time constant of the reset signal must be synchronized to reset the flip-flops before an ejection or stock advance is made. Circuit 180 does not include any memory and will therefore be only effective if a fault registry is made concurrent with the gating of amplifier 101.

Thus, only a normally open switch can be utilized as the limit switch LS4, across jack 187, a fault being registered by a switch closure to produce a periodic potential across lamp 195.

Since circuit 180 can operate only with a normally closed input, the emitter of transistor 190 is furthermore connected across a resistor 221 to the base of a transistor 222 in a probe check circuit 220. Transistor 222 is configured as a common emitter transistor connected to the voltage B+ across a base resistor 212 and including a lamp 223 between the collector and ground. The collector of transistor 222 is connected to voltage B+ and lamp 223 is therefore energized in complement with lamp 195.

In order to provide for a relatively narrow gating aperture of circuit 100, the cycle circuit 260 includes a transistor 261 forming the periodic ground for amplifier 101, transistor 261 being connected at the base across a resistor 262 in series with a coupling capacitor 263 to the floating terminal of switch 25. Connected in parallel across transistor 261 is a resistor 264, connecting the common junction of resistor 262 and capcitor 263 to ground. The other end of capacitor 263 is further tied across a resistor 266 and diode 267 to a negative D.C. signal source B—. Thus transistor 261 is normally in negative bias and therefore non-conductive until a positive switching transient is produced by the closure of switch 25. This assures a narrow and precise timing aperture for the system essentially independent of the speed of the die press.

Further included in the present invention is a selector switch 250 including three selection modes 251, 252 and 253. Mode 251 is connected to provide the automatic mode initiated according to the above sequence by the concurrent depression of switches 41 and 42. In this mode the ground return from switches 41 and 42 is completed through switch 250. In the mode 252 the ground return of switch 45 is completed across switch 250 and a closure of switch 45 will start and maintain power to the clutch 12.

The third mode, i.e. mode 253, provides a ground circuit to the base of transistor 165 whereby a concurrent depression of switches 41 and 42 will result in a jog or incremental stroke of the die press 10 which, when repeated, allows acurate positioning of the die.

Figure 3:
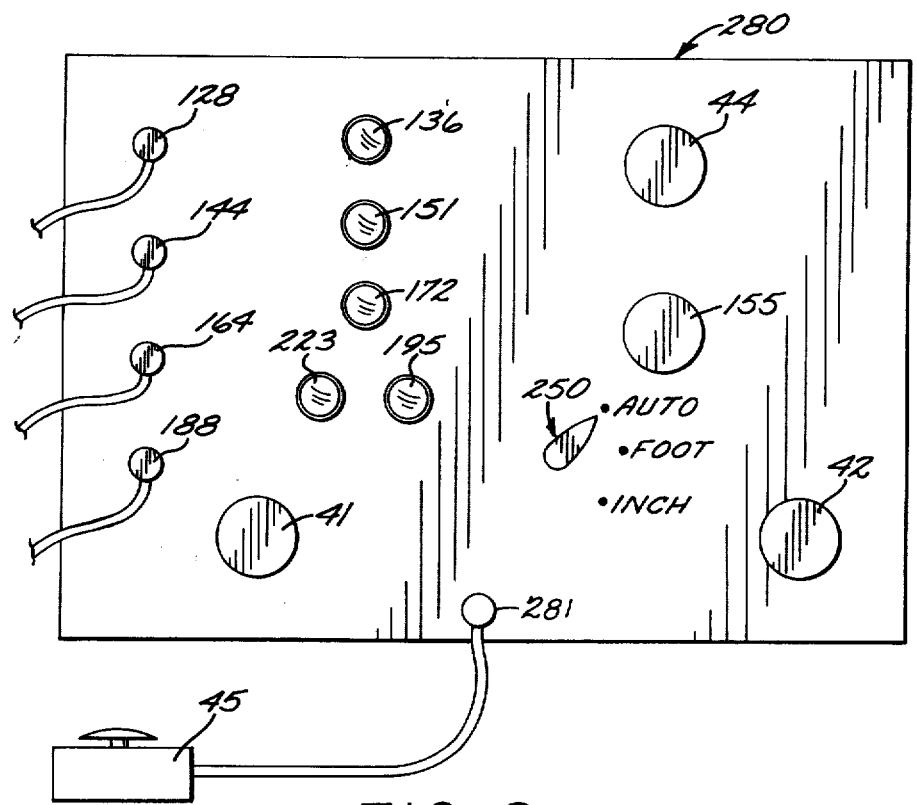
FIG. 3 is a front view of a display board constructed according to the present invention.

As shown in FIG. 3, the respective lamps 136, 151, 172, 195 and 223 are displayed on a common display panel 280 in proximate relationship with the associated input receptacles. The display panel 280 further includes switches 41 and 42 mounted at maximum horizontal separation to assure use of both hands during start up. Switches 41 and 42 are conventional push-to-make, palm button switches internally spring biased to an open state. Further included on the panel 280 is the emergency switch 44 which can be either connected across switch LS3 or to the collector of transistor 176 and the cycle stop switch 155, both also configured as push-to-close, palm buttons. The panel further includes a selector switch 250 and a jack 281 through which a selective connection can be made for the foot operated switch 45. In consideration of satefy, switch 45 is displaced away from press 10 to render impossible any manual corrections while being closed. Furthermore, the receptacles 121, 141, 161 and 181 are exposed for selective jack input on the panel to enable the respective circuits 120, 140, 160 and 180.

The operation of the present embodiment will now be described with reference to FIGs. 1, 2 and 3, and with particular reference to the details of the circuit shown in FIG. 4. Generally, the die press 10 is selectively engaged to the electric motor 11 by the clutch which is energized according to the status of the output switch 75(e) in the latching relay 75. While running, the respective limit switches LS1–LS4 are exposed to engage various projections on the stock 22. Switch LS1 registers the stroke advancement of the stock in a punch position beneath the die assembly 16 where the advancement is proper if made prior to the reset spike. On proper advancement, transistor 130 conducts dropping the true voltage at the input of flip-flop 30. Flip-flop 30 then, at the false output, drives the emitter follower to produce the gating signal to the amplifier 101, such signal being present until a switch make occurs after the reset spike is produced in the reset circuit 65. Circuit 120 is capacitively coupled to the input device where the capacitor 129 is relatively large and functions to isolate ground. Thus it is only the input transient that is significant and the timing thereof is therefore the only critical index of proper alignment. Thus circuit 120 is therefore a timing device responsive to switching transients which occur after the normal reset cycle. This feature is primarily intended to be used in conjunction with the stock advance by the automatic feed device 20.

At the same time, circuit 140, which is also a memory circuit, registers through a normally open switch LS2 any indexing holes or openings in the stock to detect stock overfeed or misalignment. The memory for this circuit is provided by the flip-flop 31 configured in a conventional flip-flop driving the output emitter follower by the false output terminal. The emitter follower output of this circuit is again fed in an OR configuration to the inverting input of amplifier 101. Amplifier 101 is connected between the voltage B+ and ground across the output transistor 261 of the cycle circuit, collecting all such inputs at the inverting input terminal and in a conventional manner producing a low output if any one or all of the inputs are high. Such low output will be produced only when the amplifier 101 is connected to ground. Upon opening of transistor 261, the output thereof will be high regardless of the status of the input terminals. Thus transistor 103, driven by the output of amplifier 101, will be thrown into a conductive state each time the amplifier 101 is floating. When in this state, the collector voltage of transistor 72 is high, energizing the coil 75(b) as long as either the contacts of switch 75(d) or switch 42 are closed. This in turn maintains the relay 75 latched, closing at the same time the output of contact switches 75(e) to complete the circuit across the clutch 12. During start up, switch 42(a) provides a secondary path across diode 79 to the top of coil 75(b) if and when the collector voltage of transistor 98 is high. The false input terminal to flip-flop 92 is connected across transistor 95 to ground and will be low or at ground until switch 43 closes. When switch 43 closes, transistor 95 is rendered nonconductive, imposing a high voltage at the false input, dropping the voltage of the true output. The true input to the flip-flop 92 is connected across a coupling capacitor and will therefore only pass a transient as produced by amplifier 101, such transient being associated with any change in state either by virtue of switch 41 or by virtue of a low output from amplifier 101.

Switching circuit 160 produces an instant stop signal which can be triggered by any switching spike across switch LS3. By virtue of the flip-flop 32 this switching spike is then converted to a step voltage which will maintain a high input at the emitter follower output across to the capacitor 175. A transient across capacitor 175 will then gate the transistor 176 to pull down the voltage out of amplifier 101 producing an immediate shut down. In the alternative, an instant stop switch 44 is connected in by-pass across the transistor 176 which provides a manual instant stop input. Circuit 180 does not include any memory and therefore provides an input to the gating circuit 100 which is essentially indicative of a condition occurring at the time that switch 25 goes through its closing transient. In this manner, any plurality or any single switch will trigger a machine shut down. Once shut down, the machine can be restarted only if switch 42 and switch 41 are closed concurrently. The closure of switches 41 and 42 must be made within the time interval set by the timing circuit 110 which also provides the redundant check on the operation of switch 25.

Figure 5:
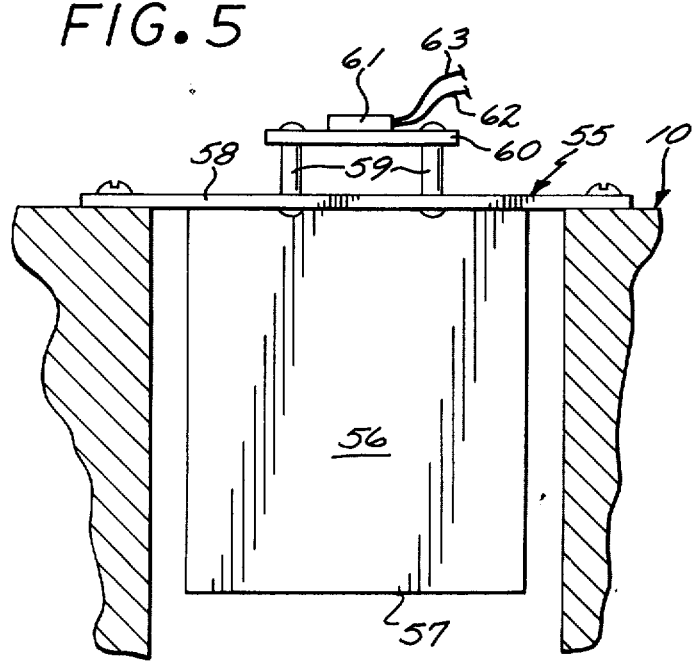
FIG. 5 is a front view of a strike plate adapted to be used with the circuit shown in FIG. 3.
Figure 6:
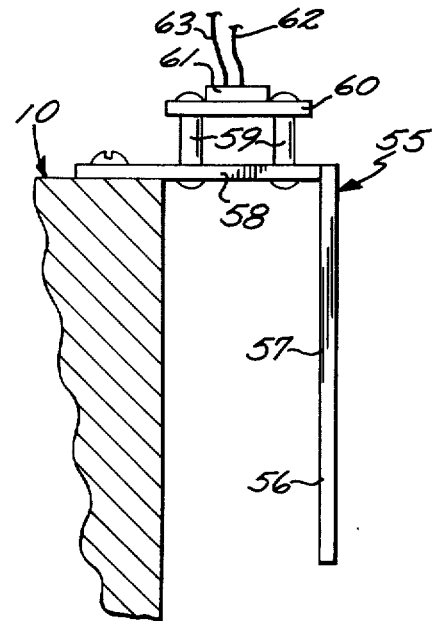
FIG. 6 is a side view of the strike plate shown in FIG. 4 arranged in operative relationship with the die press.

As a further improvement, the embodiment shown in FIG. 4 can be coupled with a strike plate 55, shown in detail in FIGS. 5 and 6. Strike plate 55 may be positioned in the die press 10 at any position across the trajectory of an ejected article after die hold release. The strike plate 55 comprises an angled mounting plate 56 suspended in cantilever across the path of the projected article comprising an upper or a horizontal plate segment 57 joined at an angle with a vertical plate segment 58, the free edge of the horizontal plate segment 57 being attached to the die press 10. The horizontal plate segment has mounted thereon a plurality of vertical stand offs 59 supporting in beam a sensing plate 60, sensing plate 60 being suspended in beam from the stand offs 59 to form a resonating structure responsive or resonating at a selected frequency bandwidth component of the impact excitation of the plate 56. Attached contiguously to the upper or the exterior surface of the sensing plate 60 is a piezoelectric crystal 61 which, through its own mass, responds to the beam resonance or beam deformation associated with each strike impulse of the sensing plate, producing an electrical signal which is passed to the input of circuit 120 by leads 62 and 63 brought in through jack 128. The signal spike produced by piezoelectric crystal 61 will trigger the transistor 130 in the conductive state at selected signal levels according to the setting of the adjustable resistor 132.

In this manner an alternative sensor configuration is made which is independent of any switch closure and which is adapted to register ejected articles as they are thrown from the die press. This particular configuration provides the additional feature of deflecting the article into any desired receiving container while at the same time providing a positive registry of the ejection of each article. In the event that an article is not registered or that an impact is of insufficient magnitude to excite the piezoelectric crystal 61, a machine stop signal will be issued from the emitter follower, i.e. across resistor 137 to the inverting input of the operational amplifier 101 driving the output thereof low concurrent with the switching transient of switch 25. This will then provide a machine stop concurrent with the maximum opening of the die where a visual inspection can be made in order to assure that the die has been properly cleared. Since the transistor 130 can be driven to a high collector state only if there is a low base input such input is derived by the switching transient or the derivative of the switching voltage produced by the impact plate. Thus the coupling through capacitor 129 assures that a false output must occur within the cycle interval set by the switch 25.

Some of the many advantages of the present invention should not be readily apparent. As described, the invention provides for a plurality of signal pick-offs which can be conveniently arranged to register either openings or projections in a sheet stock as it is aligned under the die assembly 16. Since practically all or most combinations of switching input are accommodated within the present invention, and since the input is switched to ground in almost all instances, any number of sensing switches may be disposed in parallel across selected ones of the switching circuits to register any desired configurations of registry. The invention is furthermore adapted to the conventional two hand start up requirements while including features where selected ones of the fault indicators will stop the die at a maximum separation. This particular feature provides for a convenient position of the die during machine stop whereby manual clearing or correction measures can be taken in order to resume operation. Furthermore, all circuit elements included in this invention are conventional, easy to maintain, and require a little or no adjustment.

Obviously, many modifications and variations of the present invention may be made with regard to the foregoing detailed description without departing from the spirit of the invention.

We claim:

1. An electrical monitoring and control unit for monitoring and controlling the operation of a cyclic machine tool, comprising, in combination:
   first sensing means adapted to register selected cyclic events of the machine tool for producing first switching signals indicative thereof;
   gating means connected to receive said first switching signals in predetermined combination for producing a gated output signal indicative of the status of any one or more of selected ones of said first switching signals when selected other ones thereof are in a predetermined status;
   second sensing means adapted to register selected projections in said machine tool for producing second switching signals indicative thereof; and
   main switching means connected for receiving said gated output signal and said second switching signals for effecting a machine shut down concurrent with the receipt of either one thereof.

2. An electrical monitoring and control unit according to claim 1 wherein:
   said first sensing means includes switching transient responsive means for producing a signal indicative of a switching transient associated with selected ones of said cyclic events.

3. An electrical monitoring and control unit according to claim 2 wherein:
   said main switching means includes a first and second palm button adapted to restart said machine tool at a concurrent depression thereof.

4. An electrical monitoring and control unit according to claim 3 further comprising:
   timing means adapted to receive a selected other one of said first switching signals for producing an additional second switching signal indicative of an absence thereof with a preselected time interval.

5. An electrical monitoring and control unit according to claim 4 wherein:
   said gating means include an operational amplifier connected to receive said selected ones of said first switching signals at the inverting input terminal thereof, grounding means adapted to ground said operational amplifier upon the receipt of said selected other ones of said first switching signals, and a first transistor means connected to the output of said operational amplifier.

6. An electrical monitoring and control unit according to claim 5 further comprising:
   said selected ones of said first switching signals including short memory means for maintaining the status thereof until reset by a reset signal; and
   reset means connected to said selected other ones of said first switching signals for producing said reset signal subsequent the actuation thereof.

7. An electrical monitoring and control unit according to claim 1 wherein:
   said first sensing means include a plurality of switches disposed for actuation by selected indicia within said machine tool and a strike plate disposed to intercept the ejection of an article from said machine tool.

8. In a die press including a reciprocating die mounted for cooperating reciprocal actuation with a stock advance device, and comprising a die motor, an electrically actuated clutch connected to said motor, gearing means connected between said clutch and said die stock advance device, and ejection means connected to eject the article formed in the die following a die strike, said stock advance device dispensing sheet stock below said die following each such ejection, the improvment comprising:
   first sensing means disposed in sensing proximity below said die for producing a plurality of first switching signals indicative of the alignment of said sheet stock thereat;
   second sensing means disposed in operative proximity with said die for producing a second switching signal indicative of the reciprocation thereof;
   gate means connected to receive selected ones of said first switching signals and said second switching signal for producing a gated machine shut down signal upon a combination of any one of said selected first switching signals occurring concurrent with said second switching signal;
   direct shut down means connected to receive the selected other ones of said switching signals for producing a direct shut down signal on the occurrence of any one thereof; and
   main switching circuit means connected to receive said gated and direct shut down signals for effecting an interruption of electrical power to said electrically actuated clutch upon the receipt thereof.

9. Apparatus according to claim 8 wherein:
   said main switching means further includes a start switch, a reset switch and a die hold release switch, whereby the concurrent depression of said start and reset switches prior to the switching of said die hold release switch enables a machine start up.

10. Apparatus according to claim 8 further comprising:
    said first sensing means includes a strike plate disposed to intercept the article ejected from the die press and a piezoelectric crystal mounted on said strike plate for excitation therewith, said crystal producing one said selected one of said first switching signals.

11. Apparatus according to claim 8 wherein:
    said first sensing means include first limit switches disposed to engage selected index projections on said sheet stock; and
    said second sensing means includes a second limit switch adapted to close upon the maximum opening of the die.

12. A cyclic machine tool monitoring unit comprising, in combination:

first sensing means adapted to register the automatic advancement of stock into the machine tool for producing first signal transients indicative thereof;

second sensing means adapted to register the automatic alignment of stock within the machine tool for producing switching signals indicative thereof;

cycle means adapted to sense the cycling of the machine tool for producing a second signal transient indicative thereof;

memory means each connected to receive respective ones of said first signal transients, and said switching signals for changing state upon receipt thereof;

reset means connected to receive said memory means subsequent the receipt thereof;

gating means connected to receive the output signal from said memory means and said second signal transient for producing a gate signal upon receipt of any one of said memory means output signals concurrent with said second signal transient; and main switching means connected to receive said gate signal for effecting a machine shut down upon receipt thereof.

13. Apparatus according to claim 12 further comprising:

said main switching means further including a start switch, a reset switch and a die hold release switch, whereby the concurrent depression of said start and reset switches prior to the switching of said die hold release switch enables a machine start up.

14. Apparatus according to claim 13 wherein:

said first sensing means including a strike plate disposed to intercept the article ejected from the die press and a piezoelectric crystal mounted on said strike plate for excitation therewith, said crystal producing one said selected one of said first switching signals.

* * * * *